United States Patent

[11] 3,608,908

[72] Inventors Kozo Yamamoto
Hirakata-shi;
Morihisa Naito, Moriguchi-shi, both of
Japan
[21] Appl. No. 711,673
[22] Filed Mar. 8, 1968
[45] Patented Sept. 28, 1971
[73] Assignee Matsushita Electric Industrial Co., Ltd.
Kadoma-shi, Japan
[32] Priority Mar. 15, 1967, Apr. 12, 1967
[33] Japan
[31] 42/22330 and 42/31269

[54] TAPE-VIEWING DEVICE IN MAGNETIC TAPE RECORDER OF MAGAZINE TYPE
2 Claims, 8 Drawing Figs.

[52] U.S. Cl. 274/4 E, 179/100.2 Z, 352/172
[51] Int. Cl. G11b 5/78, G11b 19/12
[50] Field of Search 274/4 C, 4 E, 11 C; 242/198, 199, 200; 179/100.2 Z; 352/172

[56] References Cited

UNITED STATES PATENTS

| | | | |
|---|---|---|---|
| 3,273,815 | 1/1966 | Schuller | 242/198 |
| 3,385,534 | 5/1968 | Staar | 274/4 C |
| 3,394,898 | 7/1968 | Laa | 274/4 E |
| 3,395,871 | 8/1968 | Ackermann et al. | 274/4 E |
| 3,400,936 | 9/1968 | Staar | 274/4 E |
| 3,439,919 | 4/1969 | Laa | 274/4 E |

*Primary Examiner*—Leonard Forman
*Assistant Examiner*—Dennis A. Dearing
*Attorney*—Stevens, Davis, Miller & Mosher

ABSTRACT: A tape recorder of the magazine type adapted to operate with a tape magazine of the kind in which a magnetic tape supplied from one reel is taken up on the other, having means through which the interior of the tape recorder body, hence the relative amount of the tape on the reels within the magazine can clearly be seen only when the magazine is inserted into the tape recorder body.

INVENTORS
KOZO YAMAMOTO,
MORIHISA NAITO,

BY Stevens, Davis, Miller & Mosher

ATTORNEYS

INVENTORS
KOZO YAMAMOTO,
MORIHISA NAITA

BY [signature]

ATTORNEYS

TAPE-VIEWING DEVICE IN MAGNETIC TAPE RECORDER OF MAGAZINE TYPE

BACKGROUND OF THE INVENTION

1. Field of the Invention

This invention relates to tape recorders of the magazine type adapted to operate with a tape magazine of the kind in which a magnetic tape supplied from one reel is taken up on the other and with which the reel shafts and the capstan are brought into driving engagement as it is progressively inserted into a magazine insertion cavity, and more particularly to tape recorders of the type described above in which the relative amount of the tape carried by the reels within the magazine is clearly visible through transparent viewing means.

2. Description of the Prior Art

Conventional tape recorders of the magazine type provided with a sight window have had the defect that the internal mechanism including the reel shafts and the capstan is seen through the sighthole window in the unloaded state of the tape recorder in which the magazine is not inserted in place and thus the otherwise beautiful appearance of the tape recorder is impaired.

SUMMARY OF THE INVENTION

It is an object of the present invention to provide a novel and improved tape recorder of the magazine type adapted to operate with a magazine of the kind equipped with two rotatable hubs for the supply and takeup of a magnetic tape enclosed therein, having a movable body provided with means for driving said tape in said magazine and movable between two extreme positions in response to insertion and withdrawal of said magazine into and out of a magazine insertion cavity in said tape recorder, and a stationary casing movably supporting said movable body therein, said movable body carrying thereon a drive motor, a capstan mounted in coaxial relation with a flywheel which is driven from said drive motor so as to drive said tape in said magazine, and reel shafts for causing rotation of said two hubs in said magazine, said casing carrying therein a magnetic head engageable with said tape in said magazine, and a pinch roller for holding said tape between it and said capstan on said movable body so as to drive said tape in cooperation with said capstan; said tape recorder comprising means for pivotally and linearly movably supporting one end of said movable body within said casing and causing a vertical movement of the other end of said movable body toward said magazine thereby establishing the condition capable of recording or reproduction, aligned tape reading windows in said magazine, means provided on said casing in registered relation with said tape-reading windows so that said tape-reading window portion of said magazine can be looked through said means, and a reflecting means disposed on the surface of said movable body at a position opposite to said tape-reading window portion of said magazine.

Other objects, advantages and features of the present invention will be apparent from the following description taken in conjunction with the accompanying drawings.

DESCRIPTION OF THE PREFERRED EMBODIMENTS

Figure 1:
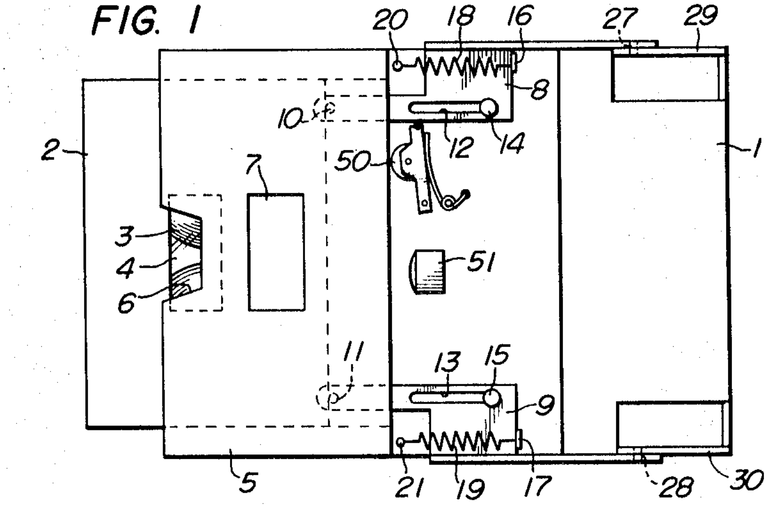
FIG. 1 is a top plan view of the tape recorder of the magazine type embodying the present invention.
Figure 2:
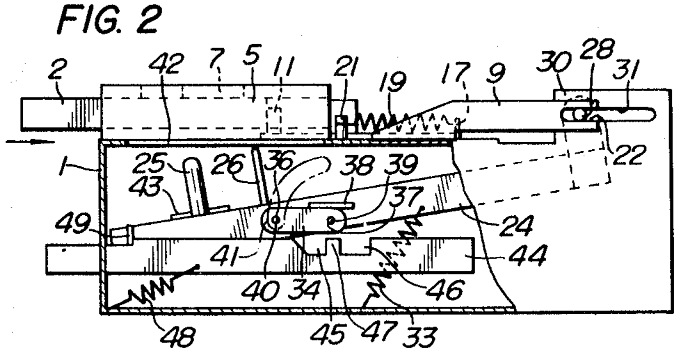
FIG. 2 is a partly sectional, side elevational view of the apparatus shown in FIG. 1, the apparatus being shown in the state before the insertion of a tape magazine.
Figure 3:
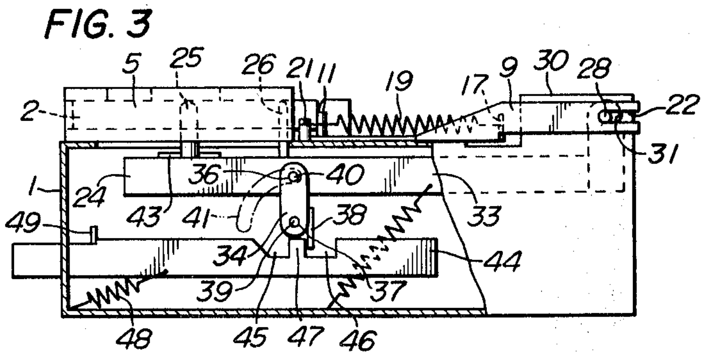
FIG. 3 is a partly sectional, side elevational view of the apparatus shown in FIG. 1, the apparatus being shown in the state after complete insertion of a tape magazine.

An embodiment of the tape recorder of the magazine type according to the present invention will be described with reference to FIGS. 1 to 3. The tape recorder comprises a generally boxlike stationary casing 1 which is provided on its upper face with a frame member 5 defining therein an insertion cavity for a tape magazine 2. The tape magazine 2 is provided with aligned tape-reading windows 4 at a position substantially centrally of its upper and lower faces so that a magnetic tape 3 enclosed in the tape magazine 2 can be looked through the windows 4. The upper panel of the frame member 5 is suitably cut out as at 6 at a middle portion of the front end overlying the entrance to the magazine insertion cavity. The upper panel of the frame member 5 is further provided with a sight hole window 7 at a central portion thereof so that the tape 3 enclosed in the tape magazine 2 can be looked through the tape-reading windows 4 and through the sight hole window 7 when the tape magazine 2 is completely inserted into the magazine insertion cavity. In the completely inserted position of the tape magazine 2, its rear end is situated inwardly beyond the front or entrance side end of the frame member 5, and in such a position, reel shafts and other drive means described later can engage the corresponding elements in the tape magazine 2. A pair of levers 8 and 9 are slidably mounted on the casing 1 and have respective upstanding pins 10 and 11 at the front ends thereof so that the pins 10 and 11 can be engaged by the leading end of the tape magazine 2 as the latter is inserted into the frame member 5, thereby urging the levers 8 and 9 inwardly or rearwardly. Elongated slots 12 and 13 extend through the central portion of the respective levers 8 and 9 in the movable direction of the latter in aligned relation with the respective pins 10 and 11 and loosely receive therein respective guide pins 14 and 15 which are secured to the upper face of the casing 1. Coil springs 18 and 19 are anchored at one end to lugs 16 and 17 formed integrally with the levers 8 and 9 and at the other end to upstanding pins 20 and 21 secured to the casing 1, respectively, so as to normally urge the levers 8 and 9 forwardly toward the frame member 5. The resilient return force of the springs 18 and 19 urges the levers 8 and 9 to return further forwardly beyond their normal inoperative position even after a downward movement of a movable body 24 described later has been completed. Cutouts 22 extend inwardly from the other ends of the respective levers 8 and 9 for the purpose described later.

Portions of the upper wall of the casing 1 are cut open and bent to stand upright to provide upstanding portions 29 and 30, and parallelly registered, slots 31 are provided in the upstanding portions 29 and 30. A movable body 24 carrying thereon tape drive means including a drive motor, a flywheel, reel shafts 25, and a capstan 26 coaxial with the flywheel is provided at one end thereof with laterally extending pins 27 and 28 which extend into the slots 31 in the upstanding portions 29 and 30 of the casing 1 and into the cutouts 22 in the levers 8 and 9 so as to pivotally as well as linearly movably support that end of the movable body 24 in the corresponding end of the casing 1. The movable body 24 is normally urged to its lower position by a spring 33. Locking members 34 of a flat oval shape are each provided with holes 36 and 37 adjacent to opposite ends, and an engaging strip 38 extends from one side of one of the locking members 34 in parallel with the length of the latter to terminate at a position beyond one end of the locking member 34. A pin 39 extending through the hole 37 disposed on the side near the engaging strip 38 pivotally connects each locking member 34 to a central portion of the side wall of the casing 1, while a pin 40 secured to the sidewall of the movable body 24 extends through the other hole 36 in the locking member 34 to be slidably received in an arcuate guide slot 41 formed in the corresponding sidewall portion of the casing 1.

As will be understood from the structure described above, the other or front end of the movable body 24 is normally urged downwardly by the force of the spring 33, and the opposite or rear end of the movable body 24 is movable in the moving direction of the levers 8 and 9 when the levers 8 and 9 are forced rearwardly against the force of the springs 18 and 19. As a result, the pins 40 secured to the sidewalls of the movable body 24 are caused to slide within the arcuate guide slots 41 thereby to urge the front end of the movable body 24 to move upwardly against the force of the spring 33, thus bringing the movable body 24 to its horizontal position as seen in FIG. 3. An aperture 42 is formed in the upper wall of the casing 1 so that the reel shafts 25 and the capstan 26 carried by the movable body 24 can project into the magazine insertion cavity in the frame member 5 when the movable body 24 is so moved upwardly.

A reflecting plate 43 in the form of a sheet of stainless steel or like material is disposed centrally of the upper face portion adjacent to the front end of the movable body 24 so that the relative amount of the tape 3 carried by the reels within the tape magazine 2 when it is inserted in the magazine insertion cavity in the frame member 5 can be distinctly seen through the sight window 7 of the frame member 5 and through the tape-reading windows 4 of the tape magazine 2 by the light reflected back from the reflecting plate 43.

A record lever 44 disposed within the casing 1 is movable in the direction which is the same as that of the levers 8 and 9 and has one end thereof projected outwardly for the casing 1. Cutouts 45 and 46 are provided in a suitably spaced relation on the upper end of the record lever 44 and define therebetween a land or lug 47. The record lever 44 is normally urged outwardly by a coil spring 48, but is limited in its outward movement by being engaged by an engaging lug 49 fixed to one of the sidewalls of the casing 1.

When the rear end of the movable body 24 is urged rearwardly by the advancing movement of the levers 8 and 9 and consequently the front end of the movable body 24 is urged upwardly to bring the movable body 24 to its horizontal position, the movable body 24 can be held in such a position by being locked by a locking mechanism (not shown) and can then be unlocked to return to its original lower position. In the course of the upward movement of the movable body 24 to take its horizontal position by being urged by the levers 8 and 9, the locking members 34 are rotated about the pins 39 so that the projected end of the engaging strip 38 moves into the inner or rear cutout 46 of the record lever 44. In FIG. 1 it will be seen that a pinch roller 50 and a magnetic head 51 are mounted on the upper face of the casing 1.

The operation of the tape recorder having a structure as described above will now be described in detail. In the inoperative position of the movable body 24 shown in FIG. 2, the front end of the movable body 24 is forced downwardly by the spring 33 and the levers 8 and 9 are held in their inoperative position by the force of the respective spring 18 and 19. In such a state, the locking members 34 are in their horizontal position. Under the above state of the tape recorder, the tape magazine 2 is inserted into the magazine insertion cavity in the frame member 5 in a direction as shown by the arrow. The leading end of the tape magazine 2 engages the pins 10 and 11 and thereby urges the levers 8 and 9 rearwardly against the force of the springs 18 and 19, which causes an upward movement of the front end of the movable body 24. Consequently, the reel shafts 25 and the capstan 26 project through the aperture 42 into the magazine insertion cavity, and in the completely inserted position of the tape magazine 2 within the insertion cavity as seen in FIG. 3, the reel shafts 25 and the capstan 26 engage the corresponding elements in the tape magazine 2, the movable body 24 being then locked in such a state by the locking mechanism.

The above movement of the front end of the movable body 24 is guided by the upwardly sliding movement of the pins 40 along the guide slots 41, and the movement of the pins 40 causes a swinging movement of the locking members 34 about the pins 39, with the result that the projected end of the engaging strip 38 fixed to one of the locking members 34 moves into the cutout 46 of the record lever 44. Because of the above situation, an attempt to force the record lever 44 inwardly by gripping the actuating end thereof thereby to place the internal electrical circuit system in the recordable state results in an utter failure due to the fact that the lug 47 of the record lever 44 is engaged by the engaging strip 38 of the locking member 34. Thus, fast forwarding or rewinding of the tape 3 in the tape magazine 2 can freely be made in the above state of the tape recorder.

The recordable condition can be established by inserting the tape magazine 2 in a state of the tape recorder in which the record lever 44 is forced inwardly against the force of the spring 48. I this case, the projected end of the engaging strip 38 integral with the locking member 34 moves now into the cutout 45 of the record lever 44 and thereby the record lever 44 is locked in such a position by being engaged by the engaging strip 38 so as to place the tape recorder in the recording condition.

The tape magazine 2 can be withdrawn from the tape recorder by merely releasing the lock imparted to the movable body 24 by the locking mechanism (not shown). The front end of the movable body 24 is restored to its normal inoperative position by the force of the spring 33, and the restoration of the movable body 24 is followed by restoration of the levers 8 and 9 to their normal inoperative position. Since the levers 8 and 9 are arranged for making a further forward movement by the force of the springs 18 and 19 even after the movable body 24 has moved to its lower position, a large force imparted to the tape magazine 2 by the pins 10 and 11 ejects the tape magazine 2 sufficiently out of the frame member 5.

In the state in which the front end of the movable body 24 has been urged upwardly due to the insertion of the tape magazine 2 and the reel shafts 25 and the capstan 26 have completely engaged the corresponding elements in the tape magazine 2, the sight hole window 7 of the frame member 5, the tape-reading windows 4 of the tape magazine 2, the aperture 42 in the casing 1, and the reflecting plate 43 are vertically aligned so that the relative amount of the tape 3 carried by the reels within the magazine 2 is easily visible from above the frame member 5 by the light passing through the windows 7 and 4 and the aperture 42 to reach the reflecting plate 43 and reflected back from the plate 43. Therefore, a glance is enough to distinctly and easily distinguish the boundary between the tape portions on the reels.

In the embodiment described above, a sighthole window 7 is provided in the upper panel of the frame member 5, but it will be understood that the desired purpose can sufficiently be attained by constructing the frame member 5 as a whole from a transparent material, which eliminates the need for the provision of the sighthole window 7.

Another embodiment of the present invention will next be described with reference to FIGS. 4 to 6. The tape recorder of the magazine type shown therein comprises a generally boxlike stationary casing 101 which is provided on its upper face with a frame member 105 defining therein an insertion cavity for a tape magazine 102. The tape magazine 102 is provided with aligned tape reading windows 104 at a position substantially centrally of its upper and lower faces so that a magnetic tape 103 enclosed in the tape magazine 102 can be looked through the window 104. A pair of levers 106 and 107 are slidably mounted on the casing 101 and have respective upstanding pins 108 and 109 at the front ends thereof so that the pins 108 and 109 can be engaged by the leading end of the tape magazine 102 as the latter is inserted into the frame member 105, thereby urging the levers 106 and 107 inwardly or rearwardly.

A movable body 110 is pivotally connected at one or rear end thereof to the rear ends of the levers 106 and 107 and is normally urged downwardly by a spring 111. The movable body 110 carries reel shafts 112 and a capstan 113 on the upper face portion adjacent to the other or front end thereof, and a drive motor and a flywheel therein. An aperture 114 is provided in the upper wall of the casing 101 so that the reel shafts 112 and the capstan 113 can project in the aperture 114, when the movable body 110 is urged upwardly, and can engage the corresponding elements in the tape magazine 102. Arcuate guide slots 115 are provided at a central portion of the sidewalls of the casing 101 and receive therein pins 116 laterally extending from the movable body 110 so that the movable body 110 can make a pivotal movement about the rear end which is pivotally mounted on the rear ends of the levers 106 and 107 while being guided at its front end portion by the arcuate guide slots 115.

A sight window 119 is provided in the upper panel of the frame member 105 and is normally covered by a front portion of a cover 117 of an opaque material which overlies the frame member 105 and has an upstanding portion 118 formed at the rear end thereof. Side panels 120 and 121 extend downwardly from the opposite sides of the cover 117 along the outer surface of the sidewalls of the casing 101 and have their lower end edges slidably fitted in respective guide frames 122 and 123 provided on the sidewalls of the casing 101. The cover 117 is supported so as to be slidable in the same direction as the moving direction of the levers 106 and 107.

A lever 124 is swingably mounted on one sidewall of the casing 101 by means of a pivot pin 125 and has a slot 126 formed at a substantially middle portion thereof. The rear end of the lever 107 is bent downwardly to provide a depending portion 127, and a pin 128 is provided adjacent to the lower end of the depending portion 127 and is slidably received in the slot 126 formed in the lever 124. A coil spring 129 is anchored at one end to a portion of the lever 124 and at the other end to a portion of the side panel 121 of the cover 117 so as to normally resiliently force the free end of the lever 124 against the upstanding end portion 118 of the cover 117. The same structure including a lever 124, a pin 125, a slot 126, a depending portion 127 integral with the lever 106, a pin 128, and a spring 129 anchored between the depending portion 127 of the lever 106 and the side panel 120 of the cover 117 is provided on the other side of the casing 101.

A substantially L-shaped locking lever 130 having a long arm and a short arm is pivoted at the merging point of the arms to one sidewall of the casing 101 by means of a pivot pin 131. A leaf spring 132 is fixed at one end to the end of the long arm of the lever 130 and has the other or free end thereof bearing against the front end edge of the side panel 121 of the cover 117, while a finger 133 formed at the end of the short arm of the lever 130 is normally engaged by an engaging lug 134 formed at the front lower end edge of the side panel 121 of the cover 117, thereby limiting the rearward movement of the cover 117.

Figure 4:
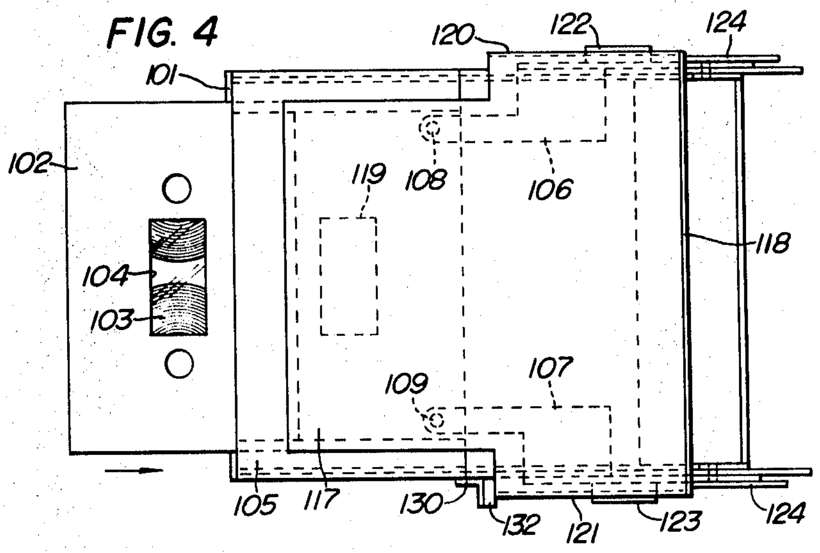
FIG. 4 is a top plan view of another embodiment of the tape recorder according to the present invention.
Figures 5, 6, 7:
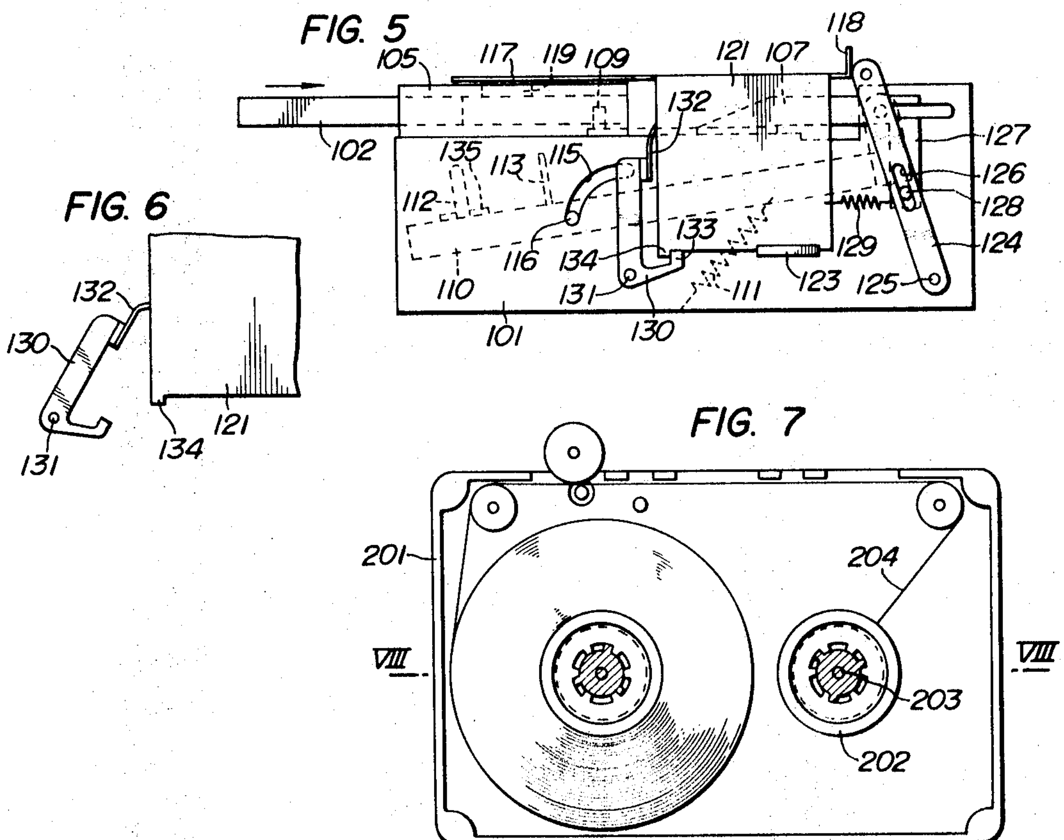
FIG. 5 is a side elevational view of the apparatus shown in FIG. 4.
FIG. 6 is a side elevational view of a locking lever and associated elements in the apparatus of FIG. 4, the locking lever being shown in its unlocked position.
FIG. 7 is a cross-sectional view of a tape magazine employed in the tape recorder of the present invention.

Referring to FIGS. 4 and 5, the tape recorder is shown in a state in which the tape magazine 102 is not completely inserted into the magazine insertion cavity. In such a state, the front end of the movable body 110 is urged downwardly by the force of the spring 111; the levers 106 and 107 are in their forward position; the levers 124 are urged counterclockwise by the force of the springs 129; the cover 117 is prevented from any movement by being restricted by the finger 133 of the locking lever 130 and by the leaf spring 132 fixed to the locking lever 130; and the sighthole window 119 of the frame member 105 is completely covered by the front portion of the cover 117.

Then when the tape magazine 102 is inserted in the direction as shown by the arrow, the leading end of the tape magazine 102 engages the pins 108 and 109 and thereby forces the levers 106 and 107 rearwardly, which causes an upward movement of the movable body 110 against the force of the spring 111 and results in the projection of the reel shafts 112 and the capstan 113 into the aperture 114 for driving engagement with the corresponding elements in the tape magazine 102. At the same time, the rearward movement of the pins 128 provided on the levers 106 and 107 causes a clockwise rotation of the levers 124 about the pins 125, thereby the springs 129 anchored to the levers 124 imparting a rearward pull to the cover 117. As a result, the finger 133 of the locking lever 130 is disengaged from the engaging lug 134 of the cover 117, and the locking lever 130 is rotated clockwise as seen in FIG. 6 to allow a free rearward movement of the cover 117. Since the front portion of the cover 117 having covered the sight window 119 of the frame member 105 moves rearwardly due to the rearward movement of the cover 117, the relative amount of the tape 103 on the reels in the tape magazine 102 can be clearly seen through the sighthole window 119 of the frame member 105 and through the tape-reading windows 104 of the tape magazine 102 from above the frame member 105 by the light reflected back from a reflecting plate 135 provided on the surface of the movable body 110 as in the previous embodiment.

After the movable body 110 has been so driven to its upper position, a suitable locking mechanism (not shown) holds the movable body 110 in such a position for the recording or reproduction. When the lock imparted by the locking mechanism is released, the movable body 110 is returned to its normal inoperative position by the force of the spring 111.

Thus, the lock imparted to the movable body 110 by the locking mechanism may be released upon completion of the recording or reproduction so as to restore the movable body 110 to its normal lower position. By the downward movement of the front end of the movable body 110, the levers 106 and 107 retract to their normal forward position thereby to eject the tape magazine 102 outwardly from the magazine insertion cavity. Since, at the same time, the levers 124 are rotated counterclockwise, the free ends of the levers 124 force the upstanding end portion 118 of the cover 117 forwardly with the result that the front portion of the cover 117 covers the sighthole window 119 of the frame member 105 again. The side panel 121 integral with the cover 117 forces the leaf spring 132 forwardly, thereby rotating the locking lever 130 counterclockwise and setting up the engagement between the finger 133 on the locking lever 130 and the engaging lug 134 on the side panel 121 of the cover 117. Thus, all the elements of the tape recorder are restored to their original position shown in FIGS. 4 and 5.

It will be understood from the above description that the cover 117 normally covering the sighthole window 119 of the frame member 105 defining therein the insertion cavity for the tape magazine 102 is arranged for movement in response to the insertion and withdrawal of the tape magazine 102 thereby to permit or inhibit a look into the interior through the sighthole window 119. Thus, in the state of the tape recorder in which the tape magazine 102 is not mounted, the internal mechanism including the reel shafts 112 and the capstan 113 is not visible due to the fact that the sighthole window 119 of the frame member 105 and the underlying aperture 114 are covered by the front portion of the cover 117, while when the tape magazine 102 is inserted in place, the cover 117 is forced rearwardly so that the relative amount of the tape 103 on the reels in the tape magazine 102 can clearly be seen through the sighthole window 119 of the frame member 105 and through the tape-reading windows 104 of the tape magazine 102.

It will be appreciated that the interior of the tape recorder according to the present invention is visible from outside only when a tape magazine is mounted therein, and in such a condition, a tape being recorded or reproduced within the tape magazine can clearly be seen as in conventional tape recorders of this kind, while when the tape magazine is withdrawn from the tape recorder, the internal mechanism cannot be seen from outside by being intercepted by the cover which helps maintain the beautiful appearance of the tape recorder. Another advantage of the tape recorder of the present invention is its inexpensiveness owing to the simple structure.

In the second embodiment described above, a sighthole window 119 is provided in the upper panel of the frame member 105, but it will be understood that the desired purpose can sufficiently be attained by constructing the frame member 105 as a whole from a transparent material, which eliminates the need for provision of the sighthole window 119.

Figure 8:
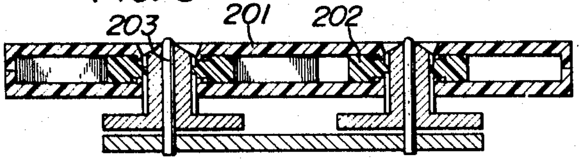
FIG. 8 is a sectional view taken along the line VIII—VIII in FIG. 7.

The shape and structure of the tape magazine preferably used with the tape recorder embodying the present invention will be briefly described with reference to FIGS. 7 and 8. The tape magazine comprises a generally rectangular casing 201 containing therein a pair of spaced rotatable hubs 202 having holes engageable with reel shafts 203. In the casing 201, a magnetic tape 204 is trained around the rotatable hubs 202 with its opposite ends securely fixed to the outer periphery of the latter.

We claim:

1. A tape recorder of the magazine type comprising: a frame member having an opening therein to receive a magazine; a movable body, said movable body including means to drive the tape within the magazine, said movable body further including tape-transducing means; means for pivotally and linearly movably supporting said movable body, comprising guiding means connected to said movable body, means defining arcuate slots in said frame member, and means defining slots in said frame member extending in the same direction as that in which said magazine is inserted, all said slots being adapted to receive said guiding means; means biasing said movable body to an inoperative position whereby insertion of a magazine into said opening causes said guiding means to move within said slots, causing said movable body to be disposed in operative relationship with the magazine; a record lever extending into said frame member; a lug located on said record lever; means defining a cutout on either side of said lug on said record lever; a pivotal locking member pivoted at one end thereof to one of said guiding means moving in one of said arcuate slots, and at the other end to said frame member; an engaging strip mounted on said locking member, said engaging strip being adapted to move into one of said cutouts when said movable body is disposed in operative relationship with said magazine; aligned upper and lower transparent windows of said magazine enabling viewing of a tape roll within said magazine, viewing means provided on said casing in registered relation with said windows of said magazine in said operative position, thereby exposing a tape roll contained in said magazine through said windows to view, and optical reflecting means disposed on the surface of said movable body beneath said lower window in said operative position, thereby facilitating the viewing of the state of winding and unwinding of said tape roll.

2. A tape recorder of the magazine type according to claim 1, further comprising a cover of an opaque material slidably covering the outer surface of said frame member, and means for slidably moving said cover in synchronous relation with the insertion or withdrawal of said magazine to thereby permit the viewing of said tape roll in said magazine.

PO-1050
(5/69)

UNITED STATES PATENT OFFICE
CERTIFICATE OF CORRECTION

Patent No. 3,608,908 Dated September 28, 1971

Inventor(s) Kozo YAMAMOTO et al

It is certified that error appears in the above-identified patent and that said Letters Patent are hereby corrected as shown below:

The title page should be amended to add the following:

All that portion of the term of this patent subsequent to November 17, 1987 is hereby disclaimed; this patent shal expire if it ceases to be commonly owned with U. S. Patent No. 3,540,738, issued November 17, 1970.

Signed and sealed this 10th day of July 1973.

(SEAL)
Attest:

EDWARD M.FLETCHER,JR.
Attesting Officer

Rene Tegtmeyer
Acting Commissioner of Patents